United States Patent [19]

Verplanke

[11] 4,315,713
[45] Feb. 16, 1982

[54] APPARATUS FOR GENERATING ENERGY FROM A FLOWING MEDIUM

[76] Inventor: Mattheus W. Verplanke, C.10 Zachariaspolder, Ijzendijke (Zeeland), Netherlands

[21] Appl. No.: 77,540

[22] Filed: Sep. 21, 1979

[30] Foreign Application Priority Data

Sep. 27, 1978 [NL] Netherlands ............... 7809790

[51] Int. Cl.³ ............................................. F03D 3/04
[52] U.S. Cl. ................................................. 415/2 R
[58] Field of Search ............... 415/2.4, 2 R, 3 R, 4 R

[56] References Cited

U.S. PATENT DOCUMENTS

| 216,208 | 6/1879 | Merritt | 416/119 |
|---|---|---|---|
| 436,595 | 9/1890 | Collins | 416/119 |
| 742,529 | 10/1903 | Trenchard et al. | 416/7 |
| 906,754 | 12/1908 | Tschirgi | 416/119 |
| 954,626 | 4/1910 | Hawley | 416/8 |
| 1,321,415 | 11/1919 | Brown | 416/119 |
| 3,986,786 | 10/1976 | Sellman | 415/2 R |

FOREIGN PATENT DOCUMENTS

| 470826 | 4/1952 | Italy | 415/2 R |
|---|---|---|---|
| 50263 | 12/1909 | Switzerland | 416/119 |

Primary Examiner—Everette A. Powell, Jr.

[57] ABSTRACT

An apparatus for generating energy from a flowing medium comprises a frame with a rotatable rotor, being composed of two parallel wheels in between which blades are arranged, said rotor being so constructed that the blades maintain a fixed position relative to the frame and therefore, to the flowing medium, because of both wheels making an obtuse angle with a line connecting their centers, while the blades are pivotally connected with the wheels.

6 Claims, 5 Drawing Figures

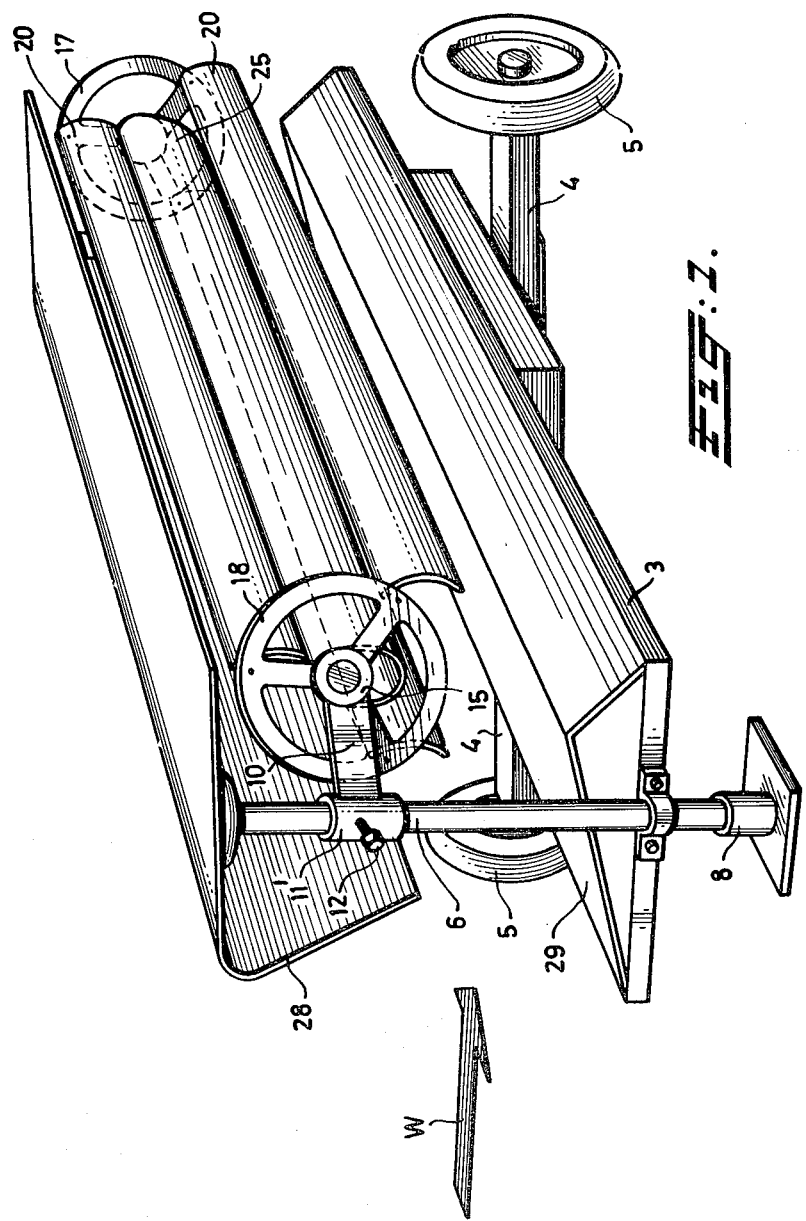

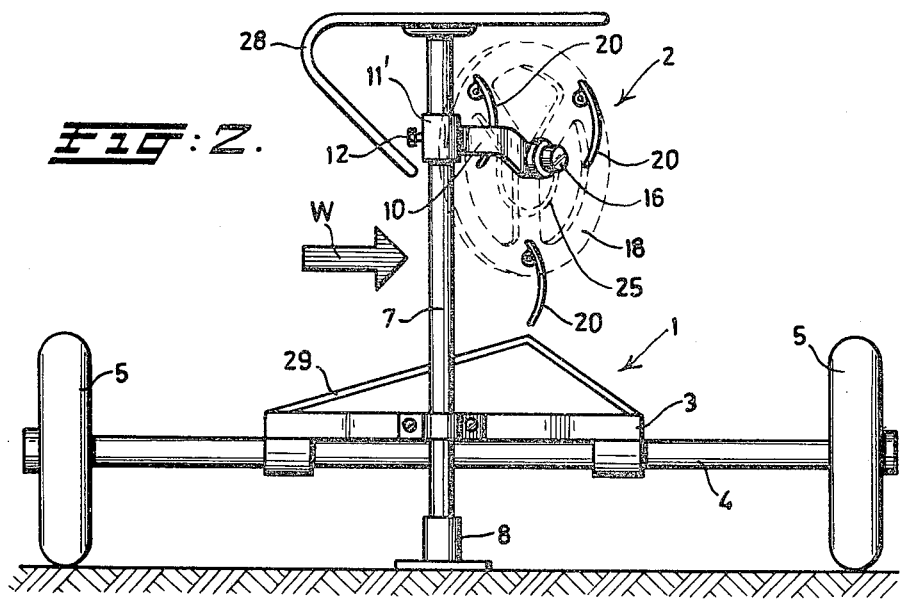
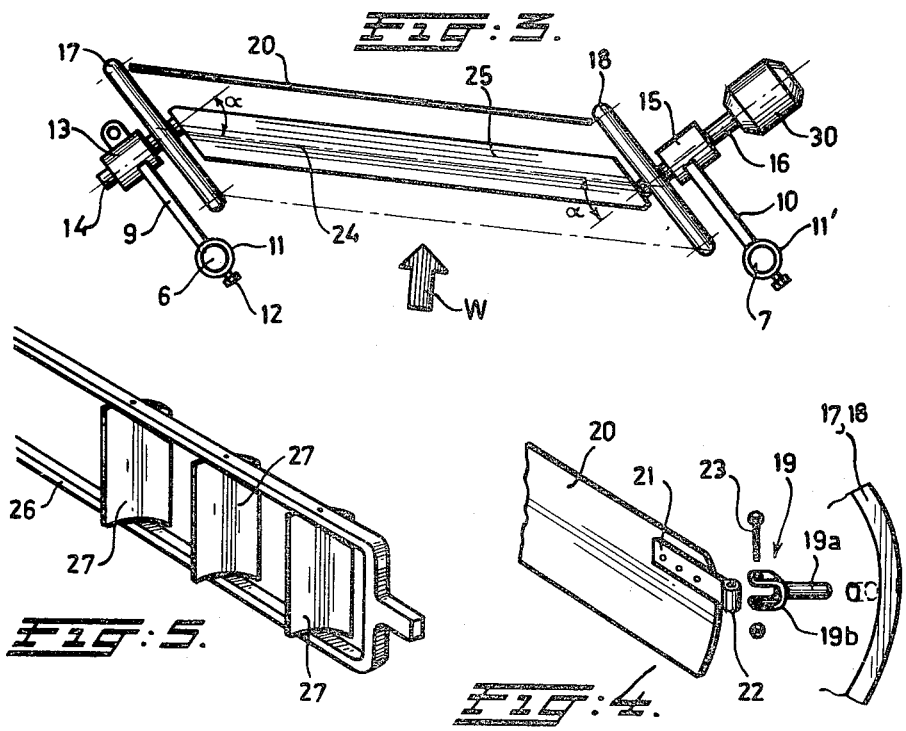

APPARATUS FOR GENERATING ENERGY FROM A FLOWING MEDIUM

BACKGROUND OF THE INVENTION

The present invention relates to an apparatus for generating energy from a flowing medium, comprising a frame with a rotatable rotor, said rotor being composed of two parallel wheels in between which oblong blades are suspended.

An apparatus of this type, a so-called wind mill or wind motor, may be used for driving various devices such as polder pumps and the like or for generating electric energy at remote places.

In known apparatus or wind mills the blades are rigidly connected with the wheels of the rotor so that during the rotation of the rotor, the blades also rotate around their longitudinal axis. On account of this the rotating blades unfortunately take their correct position relative to the flowing medium, for only a short moment.

It is an object of the present invention to provide an apparatus wherein said disadvantage is eliminated.

SUMMARY OF THE INVENTION

This is attained in accordance with the invention by mounting the blades rotatably with both ends in the wheels, whilst the rotor is so constructed that the blades maintain a fixed position with respect to the frame, during the rotation of the rotor, a cover being provided which partially screens off the rotor from the flowing medium.

Since the blades maintain a fixed position relative to the frame during rotation of the rotor and, consequently relative to the direction of flow of the medium, they may take up an optimal position with respect to the medium, during the total period of time that they are in contact with said flowing medium. It is, however, essential in this case, that the blades moving against the direction of flow of the medium are screened off.

In a preferred embodiment of the present invention, the axes of rotation of both wheels make an obtuse angle with the line connecting the centers of the wheels, each blade making a corresponding angle with parts mounted in the wheel. In this way the blades maintain their original position without the necessity of applying additional constructive provisions. Since the plane of both wheels is inclined relative to the direction of flow of the medium, said blades attain a velocity component in a direction transverse to the direction of flow of said medium.

The velocity component of the blades toward the direction of the medium flow will remain about the same in comparison with an apparatus or mill having straightly positioned wheels, i.e. wheels which are disposed parallel with the direction of the medium flow. From this it follows that by adding both velocity components, the total resulting velocity of the blades with inclined positioned wheels will be larger than the velocity of a comparable apparatus or mill with straight wheels. Experiments with a dynamometer have shown that with a relative small angle between the blades and the axis of rotation of the wheels not only the velocity of the wheels increases but that the power emitted also increases.

Preferably both extreme ends of each blade are pivotally connected to fixing elements mounted in the wheels.

On account of the latter the advantage is obtained that the angle α between the blades and the rotating axes of the wheels can be optimally adjusted.

SURVEY OF THE DRAWINGS

FIG. 1 shows a perspective view of the apparatus according to the invention;

FIG. 2 shows a diagrammatic side view of the apparatus in accordance with the present invention;

FIG. 3 shows a diagrammatic plan view of the rotor with the suspension;

FIG. 4 shows the connection of a blade in the rotor;

FIG. 5 shows a further embodiment of the blade according to the invention.

DESCRIPTION OF A PREFERRED EMBODIMENT

As appears from the drawings the present apparatus comprises a frame 1 in which a rotor 2 is suspended. The frame 1 consists of a lower frame 3 supported by a shaft 4, comprising two wheels 5 on either side of said shaft 4. On either side of the shaft 4 the lower frame 3 comprises a vertical support 6, 7, the lower end of each of said supports comprising a foot 8 resting on the bottom. At the upper end of each of the supports an arm 9, 10 is mounted, the rotor 2 being suspended in between said arms. At one end each arm comprises a sleeve 11, 11′ permitting a slidable connection between the arms and the respective supports.

In this way both arms can swing in a horizontal plane and be fixed in position by means of a screw 12. The end of the arm 9 is provided with a clamping sleeve 13 in which a spindle 14 is fixedly secured, whereas the arm 10 has a bearing sleeve 15 for receiving a spindle 16 of the rotor. The arms 9 and 10 are mounted at the same level on the supports 6 and 7, so that the center lines of the spindles 14 and 16 lie in a horizontal plane.

The rotor 2 consists of two parallel vertical wheels 17, 18, one wheel 17 being rotatably mounted on the fixedly secured spindle 14, the other wheel 18 being fixedly secured to the rotatable spindle 16.

Along the circumference of the wheels there are provided connecting elements 19. Said elements 19 consist of a pin 19a being rotatably mounted in the wheel and a fork 19b extending outside of the wheel. Between each of the two connecting elements which are facing each other an oblong blade 20 is mounted. For that purpose the ends of each blade are provided with a bar-shaped element 21, which element engages the fork 19b by means of a sleeve 22 pressed from rubber, whereafter said fork is fixed by means of a bolt connection 23 (FIG. 4). The bolts 23 are in this case disposed parallel with the supports 6, 7 so that the blades 20 are rotatable over a certain angle with respect to the connecting elements when the wheels are being adjusted.

The arms 9, 10 are so mounted on the supports 6, 7 that the spindles 14 and 16 of the wheels are not in line with one another but make an obtuse angle α with a line 24 connecting the centers of the wheels with each other (see FIG. 3). Because of the bolts 23 being mounted parallel with the swinging axis of the arms, each blade covers a corresponding angle α with the connecting elements fixed on both ends thereof. Due to the inclined position of the blades with respect to the connecting elements said blades cannot possibly rotate around their own longitudinal axis during a rotation of the rotor and they thus maintain a fixed position relative to the frame during the entire rotation of the rotor.

A hollow bar 25 with an ellipse-shaped cross-section is positioned in between the centers of the wheels 17 and 18, one end of said bar being connected to part of the spindle 14 extending through the wheel 17, whereas at the other end the wheel 18 is mounted. The cross profile of said bar approximately corresponds to the ellipse-shaped path of the blades in a plane perpendicular to the bar 25.

The blades may, instead of being formed by a single oblong sheet, each consist of a frame 26 in which a number of sheets 27 are equidistantly arranged. Said sheets 27 are mounted substantially perpendicular toward the longitudinal direction of the frame 26 and stand somewhat inclined relative to the plane of the frame. Said frame may be suspended between the wheels in a way similar to that of the blades as described hereinbefore.

A cover 28 mounted to the upper ends of the supports 6, 7, screens off the upper part of the rotor 2 from the flowing medium. The frame 3 of the assembly is provided with a plate 29 part of which forms, in cooperation with a portion of the cover, a channel converging toward the rotor 2 for the medium flow.

The apparatus according to the present invention operates as follows:

The frame is so arranged that the respective blades are positioned transverse to the direction of the wind, referenced in the drawings by the arrow W. A current of air is passed to the lower part of the rotor 2 through the channel formed by the cover 28 and the plate 29. The blades coming in contact with the current of air have a substantially vertical position and are driven by said current of air. The blades moving against the direction of flow of the medium, are hereby screened off from the medium by means of the cover 28, so that they experience a resistance, being as little as possible.

As a result of the presence of the fixed hollow bar 25 the medium is still better guided toward the blades, and the occurrence of noxious turbulences are alleviated as much as possible. Since the blades always take the most favourable position during their contact with the current of air, an optimum efficiency is obtained.

It has been proved in practice that an angle $\alpha$ of about 45° is very satisfactory. When a blade according to FIG. 5 is applied, the individual sheets 27 are preferably positioned under an angle corresponding with the angle $\alpha$ relative to the plane of the frame 26. Thus the advantage is obtained that the sheets are perpendicular to their direction of movement, while the impact of the wind against the individual sheets also acts in this direction of movement.

The wheels of the rotor are so heavily constructed that a certain flywheel action is obtained and that a uniform number of revolutions is ensured. The spindle 16 of the rotor 2 may be coupled to a generator 30 or to another device to be driven.

It should be noted that the rotor according to the invention may also be used as rotor of a water mill, whereby the same advantages are obtained as with a wind mill. In this embodiment a cover is no longer required.

What is claimed is:

1. Apparatus for generating energy from a flowing medium, comprising a frame, a rotatable rotor supported on the frame, the rotor being comprised of two spaced apart, parallel wheels, oblong blades being suspended between the wheels, connection elements supporting and suspending the blades between the wheels and rotatably mounting the blades to the wheels, each wheel having a respective axis of rotation and the axis of rotation of each wheel making an acute angle ($\alpha$) with a connection line between the centers of the wheels, each blade covers a corresponding angle with the part of the respective connection element that is rotatably mounted in the wheels, so that the blades maintain a fixed position relative to the frame during the rotation of the rotor, and a cover partially screening off the rotor from the flowing medium.

2. An apparatus according to claim 1, wherein each blade comprises an oblong frame in which a number of parallel sheets are arranged equidistantly and are supported in the frame.

3. An apparatus according to claim 1, further comprising a plate mounted in the frame, the plate and the cover are together so shaped as to form a channel for the flowing medium, which channel converges wedge-like toward the rotor.

4. An apparatus according to claim 1, wherein either end of each blade is pivotally the respective connected with connecting element arranged in the adjacent wheel.

5. An apparatus according to claim 1, wherein spindles are defined at the centers of the wheels, between the centers of the wheels a hollow bar is mounted, the bar, on either side, being connected with the spindle of the corresponding wheel.

6. In an apparatus according to claim 5, wherein the bar has an ellipse-shaped cross-section.

* * * * *